April 14, 1970    K. D. ROBINSON ET AL    3,506,515
METHOD OF PREPARING CONTINUOUS LENGTH OF HOSE
Filed Sept. 19, 1966
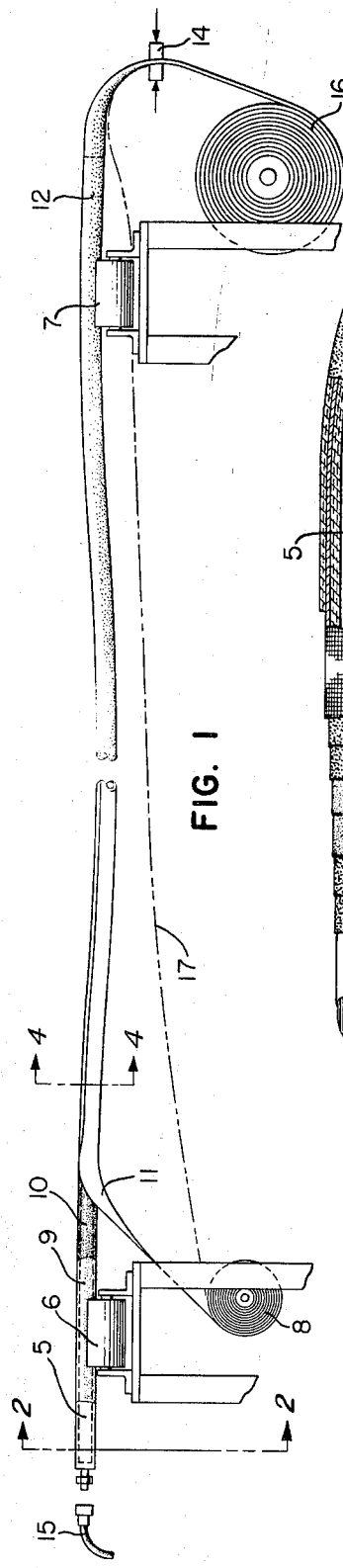
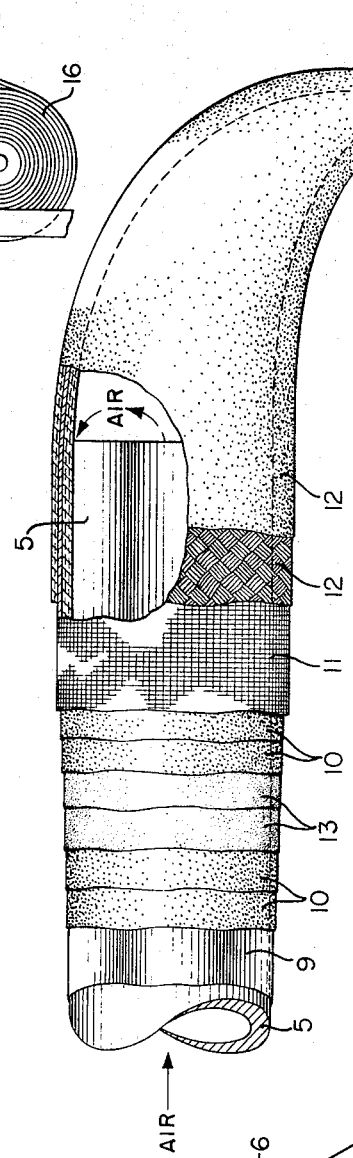
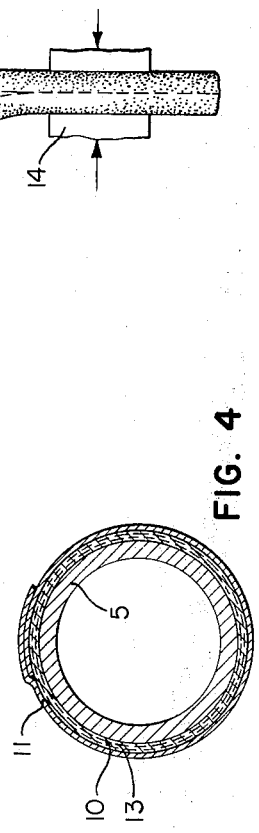
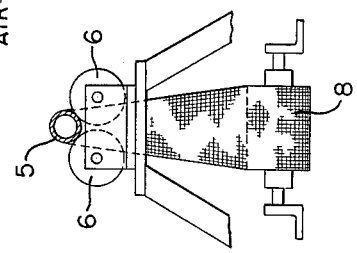
INVENTORS
KEITH D. ROBINSON
HAROLD G. HORNOR
BY
ATTORNEY

United States Patent Office 3,506,515
Patented Apr. 14, 1970

3,506,515
METHOD OF PREPARING CONTINUOUS LENGTH OF HOSE
Keith D. Robinson, Mogadore, and Harold G. Hornor, Cuyahoga Falls, Ohio, assignors to The Goodyear Tire & Rubber Company, Akron, Ohio, a corporation of Ohio
Filed Sept. 19, 1966, Ser. No. 580,396
Int. Cl. B29h 7/14
U.S. Cl. 156—173                    5 Claims

ABSTRACT OF THE DISCLOSURE

A method of preparing a length of hose having a continuous extension comprising building a first length of fabric reinforced cured polyurethane hose over a mandrel, moving the said first length of hose axially along the mandrel, and building over the said mandrel and onto the said first length of hose at least one additional length of fabric reinforced cured polyurethane hose to form a continuous extension of the said first length of hose.

---

This invention relates to a method of producing a continuous length of hose and to the said hose.

Heretofore the production of continuous lengths of reinforced hose has been difficult to achieve. Therefore, it is an object of this invention to provide a fabric-reinforced cured polyurethane hose and to provide a method of preparing such a hose. It is a further object to provide a length of fabric-reinforced cured polyurethane hose having a continuous extension and to provide a method of preparing such ahose. Such a unitary hose can have any desired length. It is a particular advantage of this invention that a continuous length of reinforced hose is produced which can withstand relatively high pressures, is very light weight relatively speaking and can be collapsed for storage in a relatively small space.

According to this invention, an improved method of preparing a continuous length of fabric reinforced hose comprises building a first length of fabric reinforced cured polyurethane hose over a mandrel, moving the said first length of hose axially along the mandrel, and building over the said mandrel and onto the said first length of hose at least one additional length of fabric reinforced cured polyurethane hose to form a continuous extension of the said first length of hose.

The advantages and objects of this invention may be more readily understood by reference to the drawings wherein FIG. 1 is alongitudinal elevational view of the hose-building apparatus; FIG. 2 is an end view in elevation along the line 2—2 of FIG. 1; FIG. 3 is a partial fragmented view of the finished hose as it appears on the building apparatus of FIG. 1; and FIG. 4 is a cross sectional view through the hose apparatus along the lines 4—4 of FIG. 1.

Reference to FIG. 1 shows a mandrel 5 which is a piece of pipe of the desired diameter and length, resting upon two sets of rollers indicated by the numerals 6 and 7. These two sets of rollers are rotatably positioned in the manner more clearly shown in FIG. 2. Positioned below the set of head end rollers 6 is a roll 8 of fabric to be utilized as the fabric reinforcing of this hose.

To build a length of hose on the apparatus of FIG. 1 the mandrel 5 is coated with a suitable releasing agent 9 such as wax or other well known materials and then at least one coat of polyurethane 10 is applied to the surface of the pipe preferably from one end to the other. When the thickness of the polyurethane coats over the release agent coating of the mandrel has been built to the desired thickness, then the cloth fabric 11 is pulled up and wrapped or lapped around the mandrel in a manner shown in FIG. 4. The fabric is pressed to a tight fit with the polyurethane coating on the building mandrel and preferably wrinkles are eliminated as well as air bubbles between it and the inner coat. The polyurethane reaction mixture forming the coating on the mandrel also serves as an adhesive to adhere the inner coat or coats 10 to the fabric 11. Subsequently, at least one additional coat of polyurethane 12 is applied over the surface of the fabric reinforcing member and allowed to dry until essentially tack-free. When the hose is to be used to contain hydrocarbons such as gasoline, kerosene, oils and various diesel and jet fuels, a coating of material 13 can be applied to an inner polyurethane coat, to the fabric, or to an outer polyurethane coat to prevent diffusion of the hydrocarbons through the wall of the hose.

It should be apparent that if the thickness of the hose wall is to be increased, then additional spray coats of the polyurethane reaction mixture may be applied over the previous coats until the hose wall has the desired thickness. The various coats of polyurethane can be dried and cured until essentially tack-free in a very short time, usually within an hour or less, depending on the nature of the polyurethane reaction mixture and the catalyst utilized. One end of the hose on the mandrel is clamped with a clamp 14 in the manner shown in FIG. 1 and FIG. 3 and then air pressure is introduced through the line 15. The air pressure releases the hose from the building mandrel to permit the hose to be slipped to the end of the mandrel and wound up into a roll as shown by numeral 16 in FIG. 1. As the length of hose is moved to the end of the building mandrel, the fabric is unrolled from the roll 8 and lies loose underneath the building mandrel as shown by numeral 17.

In a similar manner a second length of hose is prepared on the mandrel and built onto the first length of hose wherein the inner coats of polyurethane of the second length are allowed to adhere to the end of the inner layer of polyurethane of the first length of hose and the outer coats of polyurethane of the second section are allowed to adhere to the end of the outer layer of polyurethane of the first length of hose, the fabric 17 being wrapped around the inner coats of polyurethane of the second length, thus forming a continuous extension of the first length of hose. It is usually desired that the polyurethane coats of the second length overlap (from about $\frac{1}{64}$ to about 4 inches, for example) the polyurethane coats of the first section. The polyurethane coats of the second length are cured to form a unitary continuous hose comprising the first and second prepared hose lengths.

Various diameters of hose can be prepared according to the method of this invention. A hose can be prepared having an inner diameter of from at least as small as about $\frac{1}{16}$ of an inch up to at least as large as 12 inches in diameter or larger.

Thus, in the practice of this invention a fabric reinforced cured polyurethane hose having a continuous extension comprises a polyurethane inner member and at least one layer of fabric superposed upon and adhered to the said inner polyurethane member.

A method of preparing a length of hose of this invention having a continuous extension comprises preparing a first length of hose by applying at least one coat of a liquid polyurethane reaction mixture over a mandrel having a surface to which the polyurethane reaction mixture, when cured, will not tightly adhere; applying at least one fabric covering to the said polyurethane coat; releasing the first prepared hose length from the mandrel and moving the said first prepared length of hose axially along the said mandrel; applying at least one coat of a liquid polyurethane reaction mixture over the said mandrel and contacting the polyurethane coat of the said first length of hose with the liquid polyurethane reaction mixture coat; extending the fabric covering of the said first length of hose over the coat of polyurethane reaction mixture; and releasing the prepared length of hose from the said mandrel.

Suitable mandrel surfaces of this invention are surfaces to which the polyurethane reaction mixture, when cured, will not adhere. Exemplatory surfaces are those of mandrels prepared from materials known to those skilled in the art which do not adhere to the cured polyurethane such as polyethylene and polypropylene and surfaces formed by the application of various suitable release agents, also known to those skilled in the art, to the mandrel surface.

In this invention the mandrel can be coated with various release agents. Suitable release agents are those which do not react with the polyurethane reactants to reduce the flexibility, tear, tensile strength and cold temperature properties of the cured polyurethane composition. Any of the many releasing agents or parting agents known to those skilled in the art to be useful in preparing polyurethane castings may be used in this invention provided they meet the above requirements. Some of the many suitable release agents include the polyvinylalcohols such as the ones available under the trade name Gelvatol–40–10 and Gelvatol–40–20. These polyvinylalcohols are water soluble and do not detrimentally effect the interfacial properties of the cured polyurethane composition. Alternately, the mandrel can be coated with a polyethylene or polypropylene wax coating and this coating can serve as the release agent. Various other waxes can also be used.

In preparing the hose of this invention it is usually desired that sufficient coats of a polyurethane reaction mixture are applied over the mandrel to provide an inner polyurethane tubular member having a wall of from about 1 to about 50 mils thickness and to the fabric covering to provide an outer polyurethane layer of from about 1 to about 50 mils thickness. If more than one layer of fabric is applied to the inner polyurethane coating, a polyurethane coating of from about 1 to about 50 mils thickness can be applied between the layers of fabric. Each successive coat of polyurethane can be cured or partially cured before the addition of the next coat.

Coatings of other materials may be applied to an inner polyurethane coat, the fabric, or an outer polyurethane coat to prevent diffusion of various hydrocarbons through the hose. Where the hose is to be exposed to liquids which are relatively good solvents for the polyurethane or produce appreciable swelling of the polyurethane, it is usually desirable to add a barrier layer to an inner polyurethane coat, to the fabric layer, or to an outer polyurethane coat. The purpose of such a barrier is to prevent diffusion of such liquids through the wall of the hose. Representative of such liquids are various hydrocarbons exemplatory of which are various gasolines, kerosene, oils and various diesel and jet fuels. Various materials can be used for the barrier layer. Representative of such materials are polyvinyl alcohol or a polyamide such as nylon. The barrier material is usually applied by dissolving the material in a suitable solvent such as one of the lower alcohols having less than seven carbons, a liquid hydrocarbon (either aromatic, naphthenic, or paraffinic) or a ketone such as acetone or methyl ethyl ketone, and brushing or spraying the solution onto the hose. Usually a thickness of about 1 to about 10 mils is desired of the barrier material. The amount of solvent used with the barrier material should be sufficient to permit application by brushing or spraying. Usually the amount of barrier material used with the solvent is from about 5 to about 35 percent by weight.

The fabric can be applied by wrapping or lapping the fabric around the polyurethane coating. Various textile fabrics can be used such as those produced from various yarns and those produced from continuous filaments by processes known in the art. Fabrics prepared from polyamides such as nylon, from polyesters, from cellulose and cellulose derivatives such as cotton and rayon, and from wire are particularly useful. Fabrics having various weights can be used such as those having weights of from less than about 0.5 to about 15 ounces per square yard or higher.

The polyurethane reaction mixture used in this invention comprises a reactive hydrogen-containing polymeric material and an organic polyisocyanate. Usually a solvent is added to the reaction mixture so that it will be in the form of a fluid mixture or solution. Generally, sufficient solvent is added to form a solution containing from about 40 to about 65 percent solids. However, a higher or lower concentration of solids can be used. When the solids concentration is low, the individual application will deposit a thin layer of the polyurethane polymer, and a large amount of the solvent will have to be removed during the curing process. A solids concentration of 55 percent or higher is generally desired.

The reactive hydrogen-containing polymeric material used comprises at least one member selected from the group consisting of polyester polyols, polyesteramides, polyether polyols, dihydroxy-terminated polymers of conjugated diene hydrocarbons, and castor oil. The reactive hydrogen-containing material generally used has a molecular weight between about 700 and about 5000 and, usually, between about 1000 and about 3000. (If the molecular weight of the reactive hydrogen-containing material is too low, the polyurethane will not have sufficient elasticity.) Generally, the polyester polyols are the preferred active hydrogen-containing material where high strength and solvent resistance are desired.

Representative examples of polyester polyols are the condensation products of low molecular weight polyols with an organic polycarboxylic acid or anhyrdride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adapic acid, phthalic acid, terephthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low-molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioether glycols or triols, and alkyd resins. Generally, the polytetramethylene ether glycols are the preferred polyether glycols.

Representative examples of dihydroxy-terminated polymers of conjugated diene hydrocarbons are dihydroxy-terminated polymers of isoprene and butadiene.

Polyesteramides may be prepared by reacting a diamine, a glycol, and a dicarboxylic acid under conditions which will remove the water of condensation. Representative glycols and dicarboxylic acids useful in preparing polyesteramides are those useful in preparing polyesters, examples of which have already been shown. Various diamines may be used in forming the polyesteramides, representative of which are ethylene diamine, hexamethylene diamine, decamethylene diamine, cyclohexyl diamine, phenylene diamine, methylene dianiline, toluidine diamine, dichlorobenzidine, and methylene-bis-chloroaniline.

The organic polyisocyanates used in this invention include various organic diisocyanates and mixtures thereof. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methyl-one-bis(cyclohexylisocyanate) and 1,5-tetrahydronaphthalene diisocyanate, and mixtures of such diisocyanates. For the purposes of the present invention, the tolene-diisocyanates, diphenylmethane-4,4'-diisocyanate and 3,3'-dimethyl-4,4'-bisphenylene diisocyanate, are preferred. For convenience, these diisocyanates are referred to as TDI MDI and TODI, respectively.

The polyurethane polymers of this invention are usually prepared by reacting a reactive hydrogen-containing polymeric material with a polyisocyanate according to the following general procedure which is known as the prepolymer method: The reactive hydrogen-containing polymeric material is reacted with the organic polyisocyanate in proportions such that the ratio of isocyanate groups to the reactive hydrogen-containing groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amino groups. This prepolymer, itself a polyurethane, is then usually dissolved or dispersed in the solvent to form a solution or dispersion which is then reacted with a catalyst, chain extending agent, and/or a crosslinking agent to form a polyurethane reaction mixture.

Other methods known to those skilled in the art of preparing polyurethane reaction mixtures with or without solvents being present may also be used.

A catalyst can be used to facilitate the reaction which results in substantially reduced set-up time, and thus enhances the thixotropic properties of the polyurethane mixture. Well-known polyurethane catalysts are useful for this purpose such as tertiary amines and the tin salts of fatty acids.

Agents which promote chain extension and crosslinking of the polymer are also useful and are sometimes known as curing agents. Aromatic diamines, hydrocarbon diols such as ethylene glycol and propylene glycol, hydroxyl-amines such as triisopropanolamine, are used in this invention as such agents. When these agents are used they are usually added to the prepolymer in a ratio of from about 0.5/1 to about 1.5/1 and, preferably, about 0.8/1 to about 1.0/1 amine and/or hydroxyl groups of the chain extending and crosslinking agent for each isocyanate group in excess of the reactive hydrogen groups of the reactive hydrogen-containing polymeric material. Bifunctional materials such as glycols and diamines are generally preferred as chain extending and crosslinking agents. In general the bifunctional materials yield products having superior spraying properties. Representative classes of compounds suitable for use as such agents are glycols, diamines having primary or secondary amino groups, dicarboxylic acids, hydroxy amines, hydroxy-carboxylic acids, and amino-carboxylic acids. Representative examples of suitable compounds belonging to these classes are glycols such as ethylene glycol, 1,3-propane-diol, 1,4-butane-diol and glycerol; aliphatic diamines such as ethylene diamine, trimethylene diamine, and tetramethylene diamine; aromatic diamines such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the naphthylene diamines, tolylene-2,4-diamine, p-amino-benzyl aniline, and o- and p-aminodiphenyl-amine; hydroxy amines such as triethanol amine, 2-amino-ethyl alcohol, 2-amino-1-naphthol and m-aminophenyl; hydroxy carboxylic acids such as glycolic acid and alphahydroxy propionic acid; and amino carboxylic acids such as amino acetic acid and amino benzoic acid. The preferred crosslinking agents are butane diol and the chloroamines such as othro-dichlorobenzidene and methylene bis orthochloroaniline. The latter two chloroamines above are sometimes referred to herein for convenience as ODCB and MOCA, respectively.

A method for selecting the diisocyanates and diamines which form sprayable liquid reaction mixtures that can be mixed and used with a single container-type spray gun is the boiling methylene chloride turbidity test. By this method 0.2 to 0.5 molar solutions of the diisocyanate and diamine are made with methylene chloride. Equal molar amounts of the respective methylene chloride solutions of diisocyanate and diamine are raised to the boiling tempertaure and mixed. If a turbidity develops inside of 15 to 30 seconds, this combination of diisocyanate and diamine will not yield a reaction mixture which can be sprayed under normal conditions because of the high reaction rate. However, this combination can be sprayed successfully at a lower temperature or by using a spray gun having a mixing head. On the other hand, those mixtures of diisocyanate and diamine which do not produce a turbidity within about 15 to 30 seconds can be sprayed under normal spray conditions familiar to those skilled in the art.

Some combinations of polyisocyanates and crosslinking agents especially well suited for use in this invention are:

TDI—MOCA  
TDI—ODCB  
TDI—APS [1]  
TODI—MOCA  
TODI—ODCB  
TODI—APS  
MDI—MOCA  
MDI—ODCB  
Naphthalene diisocyanate—MOCA  
Naphthalene diisocyanate—ODCB  
Naphthalene diisocyanate—APS  
4,4'-diphenyl diisocyanate—MOCA  
4,4'-diphenyl diisocyanate—ODCB  
4,4'-diphenyl diisocyanate—APS Any of the non-reactive solvents normally used in making paints which are suitable for spraying are useful in this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, Cellosolve acetate, Cellosolve propylate, Cellosolve acetate butyrate, dioxane, lower nitroparaffins, etc. Mixtures of solvent may be used to obtain satisfactory spreading properties and evaporation rates when the polyurethane spray composition is applied to a polymeric surface.

If desired, pigments, surface-active agents, leveling agents, such as cellulose acetate butyrate, and other additives well known to the spray-coating art can be added to the solution or dispersion of the polyurethane reaction mixture. When a pigment is added, it is added in an amount from about 0.5 to 10 parts and, preferably, in the amount from about one to two parts of pigment per hundred parts of prepolymer by weight.

Submicroscopic pyrogenic silica has been found to be an effective leveling agent. This material is prepared by the vapor phase hydrolysis of silicon tetrachloride. Such silica, sold under the trademark CAB-O-SIL by Godfrey L. Cabot, Inc., is useful as a leveling agent in the sprayable polyurethane compositions when used in about 0.1 to 10 parts by weight per 100 parts of the prepolymer

---

[1] APS is bis(3',3'-aminophenyl)sulfone.

EXAMPLE 1

A steel mandrel 50 feet long and having a diameter of 2.5 inches was coated with wax (obtained as Johnson's traffic wax paste—heavy duty polishing wax from the Johnson Company).

A tubular section of fabric-reinforced polyurethane hose was prepared by the following method. Over the wax coating a coat of a polyurethane liquid reaction mixture was sprayed. The coat of polyurethane liquid reaction mixture was allowed to dry at about 20° C. to 30° C. for about 3.5 hours until the coat was essentially solvent-free. During this drying period the solvent evaporated and a certain amount of curing of the polyurethane coat occurred to form the inner polyurethane layer of the hose having a thicknesss of about 6 mils. A nylon square woven fabric weighing about 2 ounces per square yard was lapped around the inner layer of polyurethane in the manner shown in FIG. 4 with a one-inch lap seam. The fabirc was coated with a spray coat of a polyurethane liquid reaction mixture to form an outer polyurethane layer of about 6 mils thickness and allowed to dry and cure at about 20° C. to 30° C. for about 8 hours.

A clamp was placed over one end of the hose as shown in FIG. 1 and FIG. 3. In the manner shown in FIG. 1 and FIG. 3, air was applied to the other end of the hose thereby permitting the hose to be slipped to the end of the mandrel. A second section of fabric-reinforced polyurethane hose was prepared on the mandrel in the same general manner as the first section. The inner spray coat of the polyurethane reaction mixture was allowed to adhere to the end of the inner polyurethane layer of the first section of hose and allowed to dry and partially cure at about 20° C. to 30° C. for about 3.5 hours. The fabric was extended from the first section of hose and lapped around the inner polyurethane coat of the second section of hose in the manner shown in FIG. 4. The outer spray coat of polyurethane reaction mixture over the fabric layer was allowed to adhere to the end of the outer polyurethane layer of the first section of hose. The outer polyurethane coat of the second section of prepared hose was cured at about 20° C. to 30° C. for about 8 hours forming a unitary hose consisting of the first and second sections of the fabric-reinforced polyurethane hose.

The sprayable polyurethane liquid reaction mixtures as used in this example were prepared from a prepolymer. The prepolymer was used to prepare a black master batch by ball milling 1250 parts of the prepolymers with 375 parts Cellosolve acetate, 125 parts carbon black and 375 parts of methyl ethyl ketone. The ball milling was continued until a uniform suspension was obtained.

The sprayable polyurethane liquid reaction mixtures were prepared by mixing together 2 components just prior to the time the spray coats were to be applied. Component 1 of the spray mixture was formed by mixing 165 parts of the black master batch with a mixture consisting of 1500 parts of prepolymer, 450 Cellosolve acetate, 450 parts of methyl ethyl ketone and 72 parts of a solution of cellulose acetate butyrate containing 10 percent by weight of a mixture containing 50 percent xylene and 50 percent methyl Cellosolve acetate. Component 2 of the sprayable mixture comprised 153 parts of methylene-bis-orthochloroaniline and 153 parts of methyl ethyl ketone.

The following prepolymers are suitable for use in the formation of component 1 of this example:

Prepolymer A

A reaction product of 2 mols of tolylene diisocyanate with about 1 mol of a polyester having a molecular weight of from about 1000 to about 2000 formed by condensing an excess of ethylene glycol with adipic acid.

Prepolymer B

Same as Prepolymer A except that about 1.1 mols of the diisocyanate are reacted with the polyester.

Prepolymer C

Same as Prepolymer A except proplene glycol was used to produce the polyester instead of ethylene glycol.

Prepolymer D

Same as Prepolymer A except methylene diphenylene diisocyanate was used instead of toluene diisocyanate.

Prepolymer E

The same as Prepolymer C except methylene diphenylene diisocyanate was used instead of toluene diisocyanate.

Prepolymer F

The reaction product of 2 mols of toluene diisocyanate with 1 mol of a polytetramethyleneether glycol having a molecular weight of about 3000.

Prepolymer G

The reaction product of 2 mols of toluene diisocyanate with 1 mol of a polyester having a molecular weight of from about 1000 to about 15000 prepared by the condensation of adipic acid with an excess of a mixture consisting of 80 percent by weight ethylene glycol and 20 percent by weight propylene glycol.

In this particular example, Parepolymer G was used to prepare a sprayable polyurethane liquid reaction mixture used for the inner polyurethane layer and Prepolymer F was used to prepare the outer polyurethane layer of the hose.

The sprayable polyurethane compositions of this invention have thus far been described as comprising a prepolymer, a solvent, a crosslinking agent and certain other additive agents. Although the embodiments described previously herein illustrate the best method of accomplishing this invention, those skilled in the art would realize that sprayable reaction mixture comprising a reative hydrogen containing polymeric material and an organic diisocyanate in sufficient solvent can be mixed and then sprayed, even immediately, if desired, upon the container form. Then in a very short time the spray coat will react to form the prepolymer in situ on the mandrel. Hence, the prepolymer which now forms the coating can be crosslinked by exposure to an atmosphere which contains vapors such as those of water, diamine or glycol to produce a polyurethane composition of a nature simulating that obtained by the previously described embodiments. It is to be appreciated that the use of crosslinking agents having acid groups tend to produce cellulose polyurethane structures which can be useful in preparing a hose having buoyancy.

EXAMPLE 2

According to the method of Example 1, 100 feet of a unitary fabric reinforced cured polyurethane hose was prepared on a 2.5 inch diameter mandrel 50 feet long. Prepolymer G was used to prepare a sprayable polyurethane used for the inner polyurethane layer to obtain the strength advantages of a polyester-polyurethane and Prepolymer F was used to prepare the outer polyurethane layer of the hose to obtain the biodegradable resistance of polyether polyol polyurethanes. The hose had an inside diameter of about 2.5 inches, a wall thickness of about 0.04 inch, and weighed about 3 ounces per foot. The hose had a bursting strength of at least 150 pounds per square inch.

The hose is characterized by being capable of being rolled upon itself into a spiral coil, the said coil having a diameter of about 20 inches when the said hose has a length of 100 feet. Thus, it is a unique feature of this invention that a light-weight, thin-walled hose can be prepared according to the invention having a bursting strength of at least 150 pounds per square inch that can easily be compacted into a small enough space to be easily carried and transported by an individual. It is to be understood that the coil diameter characterization of this hose is affected primarily by the wall thickness of the hose. Thus, a hose having a bursting strength of at least 150 pounds per square inch and having an inside diameter of about 7 or 8 inches would form a spiral roll having a diameter of about 22 to about 23 inches. The very slight additional wall thickness of the hose, even though the inside diameter of the hose is about 3 times larger, is a result of using a building fabric of additional strength. Correspondingly, such a hose having about a 13 inch inner diameter would form a spiral roll having a diameter of about 35 inches. It is to be appreciated that a hose having a higher or lower bursting pressure would form a spiral roll having a corresponding greater or lesser diameter for a comparable hose inner diameter.

It should be obvious to those skilled in the art that suitable hose couplings can be attached to the lengths of hose prepared according to this invention by methods known such as by clamping and swaging the couplings to the hose thereby preparing a hose capable of being attached to other lengths of hose and to other couplings.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a length of hose having a continuous extension which comprises preparing a first length of hose by applying at least one coat of a liquid polyurethane reaction mixture over a mandrel having a surface to which the polyurethane reaction mixture, when cured, will not tightly adhere; applying at least one fabric covering to the said polyurethane coat; drying and curing the said reaction mixture until it is essentially tack-free; releasing the first prepared hose length from the mandrel and moving the said first prepared length of hose axially along the said mandrel; applying at least one coat of a liquid polyurethane reaction mixture over the said mandrel and contacting the liquid polyurethane reaction mixture coat with the polyurethane coat of the said first length of hose; extending the fabric covering of the said first length of hose over the coat of polyurethane reaction mixture; drying and curing the said reaction mixture until it is essentially tack-free; and releasing the prepared length of hose from the said mandrel.

2. A method according to claim 1 wherein the said polyurethane reaction mixture comprises (a) a reactive hydrogen-containing polymeric material having a molecular weight between about 700 and about 5000 selected from the group consisting of polyester polyols, polyester amides, polyether polyols, substantially dihydroxyl-terminated polymers of conjugated diene hydrocarbons and castor oil (b) an organic polyisocyanate, the overall molar ratio of the isocyanate groups of the polyisocyanate to the reactive hydrogens of the hydrogen-containing polymeric material being between about 1.1/1 and about 12/1, and (c) at least one compound selected from the bifunctional reactants consisting of glycols, diamines having primary amino groups, diamines having secondary amino groups, dicarboxylic acids, hydroxy amines, hydroxy-carboxylic acids, and amino-carboxylic acids, in a ratio of from about 0.5/1 to about 1.5/1 of amine, hydroxyl and acid groups to the isocyanate groups in excess of the reactive hydrogens of the reactive hydrogen-containing polymeric material.

3. A method according to claim 2 wherein the said polyurethane reaction mixture comprises a polyester polyol, an organic diisocyanate, and a diamine.

4. The method according to claim 3 which comprises preparing a length of hose having a bursting strength of at least 150 pounds per square inch and where the said hose is capable of forming a single layer spiral coil having a diameter of about 20 inches when the hose has a length of 100 feet, an inside diameter of about 2.5 inches, a wall thickness of about 0.04 inch and a weight of about 3 ounces per foot.

5. The method according to claim 2 wherein the said polyurethane reaction mixture coats contain a solvent, are prepared from a polyester polyol, an orgatnic diisocyanate and a diamine, are applied by spraying, and are allowed to dry and cure until at least essentially tack-free, and the fabric covering is a textile fabric prepared from materials selected from polyamides, polyesters, cellulose, cellulose derivatives and wire.

References Cited

UNITED STATES PATENTS

| | | | |
|---|---|---|---|
| 3,216,876 | 11/1965 | Tyhurst | 156—173 |
| 3,245,852 | 4/1966 | Martin et al. | 156—143 X |
| 3,306,797 | 2/1967 | Boggs | 156—173 X |
| 3,251,381 | 5/1966 | Koch | 138—125 |
| 3,266,527 | 8/1966 | Ross | 138—125 |
| 3,310,447 | 3/1967 | Matthews | 138—125 X |
| 3,383,258 | 5/1968 | Houlston | 138—125 X |

PATRICK D. LAWSON, Primary Examiner

U.S. Cl. X.R.

138—125

PO-1050
(5/69)

UNITED STATES PATENT OFFICE
CERTIFICATE OF CORRECTION

Patent No. 3,506,515  Dated April 14, 1970

Inventor(s) Keith D. Robinson and Harold G. Horner

It is certified that error appears in the above-identified patent and that said Letters Patent are hereby corrected as shown below:

Column 4, line 37, "anhyrdride" should be "anhydride".

line 42, "adapic" should be "adipic".

Column 5, line 15, "tolene" should be "toluene".

Column 6, line 20, "tempertaure" should be "temperature".

line 70, "CAB-O-SIL" should be "CAB-o-SIL".

line 75, "3'3'-" should be "3,3'-"

Column 7, line 27, "fabirc" should be "fabric".

Column 8, line 32, "15000" should be "1500".

line 35, "Parepolymer" should be "Prepolymer"

line 58, "cellulose" should be "cellular"

Column 10, line 34, "orgatnic" should be "organic".

SIGNED AND
SEALED
NOV 3 1970

(SEAL)
Attest:

Edward M. Fletcher, Jr.
Attesting Officer

WILLIAM E. SCHUYLER, JR.
Commissioner of Patents